United States Patent
Kehlet et al.

(10) Patent No.: US 6,831,653 B2
(45) Date of Patent: Dec. 14, 2004

(54) GRAPHICS PIXEL PACKING FOR IMPROVED FILL RATE PERFORMANCE

(75) Inventors: David Kehlet, Los Altos, CA (US); Nandini Ramani, Saratoga, CA (US); Yan Yan Tang, Mountain View, CA (US); Roger W. Swanson, Morgan Hill, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 200 days.

(21) Appl. No.: 09/919,551

(22) Filed: Jul. 31, 2001

(65) Prior Publication Data

US 2003/0025701 A1 Feb. 6, 2003

(51) Int. Cl.$^7$ .................................................. G09G 5/36
(52) U.S. Cl. ....................... 345/558; 345/506; 345/537; 345/629
(58) Field of Search ................................. 345/501–506, 345/519–520, 522, 530–574, 614, 629

(56) References Cited

U.S. PATENT DOCUMENTS

| | | | | |
|---|---|---|---|---|
| 5,859,651 A | | 1/1999 | Potu | |
| 5,990,904 A | * | 11/1999 | Griffin | 345/631 |
| 6,247,114 B1 | * | 6/2001 | Trull | 712/216 |
| 6,259,826 B1 | * | 7/2001 | Pollard et al. | 382/284 |
| 6,344,852 B1 | * | 2/2002 | Zhu et al. | 345/418 |
| 6,470,368 B1 | * | 10/2002 | Garg et al. | 708/446 |
| 6,657,635 B1 | * | 12/2003 | Hutchins et al. | 345/543 |
| 2002/0171651 A1 | | 11/2002 | Kurihara et al. | |

* cited by examiner

Primary Examiner—Kee M. Tung
(74) Attorney, Agent, or Firm—Meyertons Hood Kivlin & Goetzel, P.C.; Jeffrey C. Hood

(57) ABSTRACT

A system and method for packing pixels together to provide a increased fill rate in a frame buffer hardware in the graphics system. The graphics system may be configured to receive and rasterize graphics data at a faster cycle rate than the system's frame buffer memory fill rate. The output from the rasterization hardware may be stored in a FIFO memory that is configured to selectively shift pixels in order to improve fill rate performance. The FIFO memory may be configured to ensure that the pixels meet certain criteria in order to prevent page faults and interleave conflicts that could reduce the fill rate. The FIFO memory may also be configured to remove empty cycles that occur as a result of the pixel packing.

18 Claims, 15 Drawing Sheets

| FILL RATE OF TILE MERGING UNIT IN PIXELS/CLK | | | | | | | | |
|---|---|---|---|---|---|---|---|---|
| TRIANGLE SIZE (IN PIXELS) | FIFO DEPTH | | | | | | | |
| | 2 | 3 | 4 | 5 | 6 | 7 | 8 | 12 |
| 25 | 2.83 | 2.97 | 3.05 | 3.07 | 3.1 | 3.12 | 3.15 | 3.19 |
| 10 | 2.54 | 2.72 | 2.74 | 2.75 | | | | |
| 5 | 2.26 | 2.33 | 2.33 | | | | | |
| 1 | 1.4 | | | | | | | |

FIG. 9

| FILL RATE OF TILE MERGING UNIT IN MILLION TRIANGLES/SEC. | | | | | | | | |
|---|---|---|---|---|---|---|---|---|
| TRIANGLE SIZE (IN PIXELS) | FIFO DEPTH | | | | | | | |
| | 2 | 3 | 4 | 5 | 6 | 7 | 8 | 12 |
| 25 | 20.39 | 21.42 | 21.97 | 22.16 | 22.35 | 22.46 | 22.69 | 23 |
| 10 | 45.86 | 49.1 | 49.37 | 49.51 | | | | |
| 5 | 81.61 | 83.88 | | | | | | |
| 1 | 253 | | | | | | | |

FIG. 10

| MODULE | 1-4 PIX | 5 PIX | 10 PIX | 25 PIX |
|---|---|---|---|---|
| SU | 3.4 CLKS/PRIM | | | |
| EW | 1 CLK/PRIM | 1.5 CLK/PRIM | 2 CLK/PRIM | 3.3 CLK/PRIM |
| SW | 1-3.8 PIX/CLK | 4.7 PIX/CLK | 5.6 PIX/CLK | 6.75 PIX/CLK |
| FP | 1-2.6 PIX/CLK | 2.64 PIX/CLK | 3.14 PIX/CLK | 3.3 PIX/CLK |

FIG. 12

| MODULE | 1-4 PIX | 5 PIX | 10 PIX | 25 PIX |
|---|---|---|---|---|
| SU | 73.53 M TRI / SEC | | | |
| EW | 250 M TRI / SEC | 166 M TRI / SEC | 125 M TRI / SEC | 75.7 M TRI / SEC |
| SW | 235 M TRI / SEC | 235 M TRI / SEC | 133 M TRI / SEC | 67.5 M TRI / SEC |
| FP | 162 M TRI / SEC | 130 M TRI / SEC | 78 M TRI / SEC | 32.9 M TRI / SEC |

FIG. 13

| MODULE | 1-4 PIX | 5 PIX | 10 PIX | 25 PIX |
|---|---|---|---|---|
| SU | 5 CLKS/PRIM | | | |
| EW | 2 CLK/PRIM | 2.5 CLK/PRIM | 3 CLK/PRIM | 4 CLK/PRIM |
| SW | 0.5-1.9 PIX/CLK | 2.3 PIX/CLK | 2.6 PIX/CLK | 3.3 PIX/CLK |
| FP | 1-2.6 PIX/CLK | 2.5 PIX/CLK | 2.5 PIX/CLK | 2.7 PIX/CLK |

FIG. 14

| MODULE | 1-4 PIX | 5 PIX | 10 PIX | 25 PIX |
|---|---|---|---|---|
| SU | 50 M TRI / SEC | | | |
| EW | 125 M TRI / SEC | 100 M TRI / SEC | 83 M TRI / SEC | 62 M TRI / SEC |
| SW | 118 M TRI / SEC | 115 M TRI / SEC | 65 M TRI / SEC | 33 M TRI / SEC |
| FP | 162 M TRI / SEC | 130 M TRI / SEC | 62 M TRI / SEC | 27 M TRI / SEC |

FIG. 15

| FCLK | 5 PIX/ TRI | 10 PIX/ TRI | 25 PIX/ TRI | 5 PIX M TRI/SEC | 10 PIX M TRI/SEC | 25 PIX M TRI/SEC |
|---|---|---|---|---|---|---|
| 130 | 2.94 | 3.15 | 3.11 | 76.44 | 40.95 | 16.17 |
| 140 | 2.92 | 3.15 | 3.11 | 81.76 | 44.1 | 17.42 |
| 150 | 2.76 | 3.14 | 3.11 | 82.8 | 47.1 | 18.66 |
| 160 | 2.6 | 3.06 | 3.11 | 83.2 | 48.96 | 19.9 |
| 170 | 2.45 | 2.9 | 3.11 | 83.3 | 49.53 | 21.15 |
| 175 | 2.39 | 2.82 | 3.11 | 83.65 | 49.35 | 21.77 |
| 180 | 2.33 | 2.75 | 3.1 | 83.88 | 49.5 | 22.32 |
| 185 | 2.26 | 2.67 | 3.07 | 83.62 | 49.4 | 22.72 |
| 190 | 2.2 | 2.6 | 3.02 | 83.6 | 49.4 | 22.95 |
| 195 | 2.15 | 2.54 | 2.97 | 83.85 | 49.53 | 23.17 |
| 200 | 2.09 | 2.47 | 2.9 | 83.6 | 49.4 | 23.2 |
| 210 | 1.99 | 2.36 | 2.77 | 83.58 | 49.56 | 23.27 |
| 220 | 1.9 | 2.25 | 2.65 | 83.6 | 49.5 | 23.32 |
| 225 | 1.86 | 2.2 | 2.59 | 83.7 | 49.5 | 23.31 |

FIG. 16

GRAPHICS PIXEL PACKING FOR IMPROVED FILL RATE PERFORMANCE

BACKGROUND OF THE INVENTION

1. Field of the Invention

The present invention generally relates to the field of computer graphics systems. More particularly, the present invention relates to rasterization and fill rate within computer graphics systems.

2. Description of the Related Art

Modern graphics systems have been rapidly increasing their performance as the result of ever increasing clock speeds and higher levels of integration. Smaller geometries and higher clock frequencies have led to significant improvements in the number of triangles that may be rendered per frame, and the number of frames that may be rendered per second.

However, new applications such as three-dimensional (3D) modeling, virtual reality, and 3D computer games continue to demand even greater performance from graphics systems. Thus designers have continued to improve performance throughout the entire graphics system pipeline to try and meet the performance needs of these new applications.

FIG. 1 illustrates one example of a generic graphics system, but numerous variations are possible and contemplated. As shown in the figure, initially graphics data is read from a computer system's main memory into the graphics system. The graphics data may include polygons, NURBS (Non-Uniform Rational B-Splines), sub-division surfaces, and other types of data. The various types of data are typically converted into triangles (i.e., three vertices each having at least position and color information). Then, transform and lighting calculation units 50 receive and process the triangles. Transform calculations typically include changing a triangle's coordinate axis, while lighting calculations typically determine what effect, if any, lighting has on the color of triangle's vertices. The transformed and lit triangles are then conveyed to a clip test/back face culling unit 52 that determines which triangles are outside the current parameters for visibility (e.g., triangles that are off screen).

Next, the triangles that pass the clip test and back-face culling are translated into screen space 54. The screen space triangles are then forwarded to the set-up and draw processor 56 for rasterization. Rasterization typically refers to the process of generating actual pixels by interpolation from the vertices. In some cases samples are generated by the rasterization process instead of pixels. A pixel typically has a one-to-one correlation with the hardware pixels present in a display device, while samples are typically more numerous than the hardware elements and need not have any direct correlation to the display device. Regardless of whether pixels or samples are used, once drawn they are stored into a frame buffer 58.

Next, the pixels are read from frame buffer 58 and converted into an analog video signal by digital-to-analog converters 60. If samples are used, the samples are read out of frame buffer 58 and filtered to generate pixels, which are then conveyed to digital to analog converters 60. The video signal from converters 60 is conveyed to a display device 62 such as a computer monitor, LCD display, or projector.

As noted above, many applications place great demands on graphics systems. In some graphics systems, the rasterization algorithm is configured to calculate multiple pixels/samples per clock cycle called "tiles". Unfortunately, this can lead to less than ideal datapath utilization due to an effect called fragmentation. Fragmentation occurs when a portion of the rasterization hardware is assigned to areas outside of the geometry currently being rasterized. For example, a rasterization algorithm that calculates tiles of two horizontally adjacent pixels per cycle may experience fragmentation when the geometry being rasterized has an odd width in pixels. The last cycle of rasterization on an odd width will have only one pixel to calculate. The adjacent pixel, being outside of the current geometry, will not be rendered. This causes an inefficiency as subsequent hardware in the pipeline will be unused for this tile's missing or disabled pixel. For example, if the set-up and draw processor is configured to rasterize one tile having two pixels per clock cycle, and if the frame buffer memory is configured to store one tile per clock cycle, then only 50% of the frame buffer's memory bandwidth is used on cycles that write only one pixel. This inefficiency can cause a reduction in graphics system performance because frame buffer bandwidth (also called fill rate) is often a limiting factor in graphic systems. Thus, a system and method capable of improving fill rate performance with respect to fragmentation is desired.

SUMMARY

The problems set forth above may at least in part be solved by a system and method that are capable of packing pixels together to provide a more efficient utilization of post-rasterization hardware in the graphics system.

In one embodiment, the graphics system is configured to receive and rasterize graphics data. The rasterization process may be performed at a faster cycle rate than the post-rasterization hardware in the graphics system. The output from the rasterization hardware is stored in a FIFO memory that is configured to shift pixels in order to improve fill rate performance. Advantageously, in some embodiments spatial adjacency and pixel enable matching between cycle requirements may be reduced or eliminated. Furthermore, in some embodiments pixels may be packed from several different cycles into the current cycle, including skipping over cycles that do not contain a packing opportunity.

In one embodiment, the method includes storing tiles of potentially fragmented rasterization data (e.g., pixels) into a queue (e.g., in FIFO memory) in which writes to the frame buffer are assembled. For each unused pixel position in the tile at the head of the queue, a search is performed looking back into the queue for a tile that contains an enabled pixel in the same position (e.g., relative pixel position within the tile). Pixels meeting selected criteria (e.g., belonging to the same memory block and different interleave relative to the other pixels in the tile with the empty pixel position) are removed from their original tile and placed in a tile at the head of the queue. Any tiles in the queue that no longer contain any pixels may be dropped. By dropping empty tiles in a faster clock domain and sending more fully packed cycles to a slower clock domain, the utilization of the slower clock domain is improved. This may advantageously improve the percentage utilization of the frame buffer's fill bandwidth.

Since the tile at the head of the queue may contain pixels from a different part of the screen relative to the tiles behind the head of the queue, the tile at the head of the queue may be configured to carry unique position information for each pixel. That information may be derived from information carried with each pixel's original tile.

Through selection of the depth of the queue (i.e., the number of tiles that are candidates for selecting pixels for packing), the utilization can be improved and a tradeoff of packing hardware versus utilization can be made.

Certain graphics memory systems place restrictions on the X and Y screen locations that can be stored to the frame buffer in a single cycle. For example, if a particular store cycle contains pixels from different DRAM pages, the frame buffer memory may not be able to process this store in a single clock cycle. Advantageously, however, the method may be configured to allow for restrictions on X and Y locations of the pixels that are candidates for packing together in a single tile/cycle. While inspecting subsequent tiles for possible pixel packing opportunities, a check of the subsequent tile's X and Y locations can be made. If that tile is in a screen location that is not compatible with the memory system's restrictions, then that subsequent cycle is not considered for pixel packing.

BRIEF DESCRIPTION OF THE DRAWINGS

The foregoing, as well as other objects, features, and advantages of this invention may be more completely understood by reference to the following detailed description when read together with the accompanying drawings in which:

FIGS. 9–10 are tables illustrating sample performance characteristics for different FIFO memory sizes;

FIGS. 12–13 are tables illustrating sample performance characteristics for a sample graphics system that implements one embodiment of pixel packing;

FIG. 14 depicts one embodiment of a FIFO configured without tags;

FIG. 15 depicts one embodiment of a FIFO configured to utilize tags; and

FIG. 16 is a table illustrating performance values with respect to frame buffer clock (FCLK) for several different scenarios.

Figure 1:
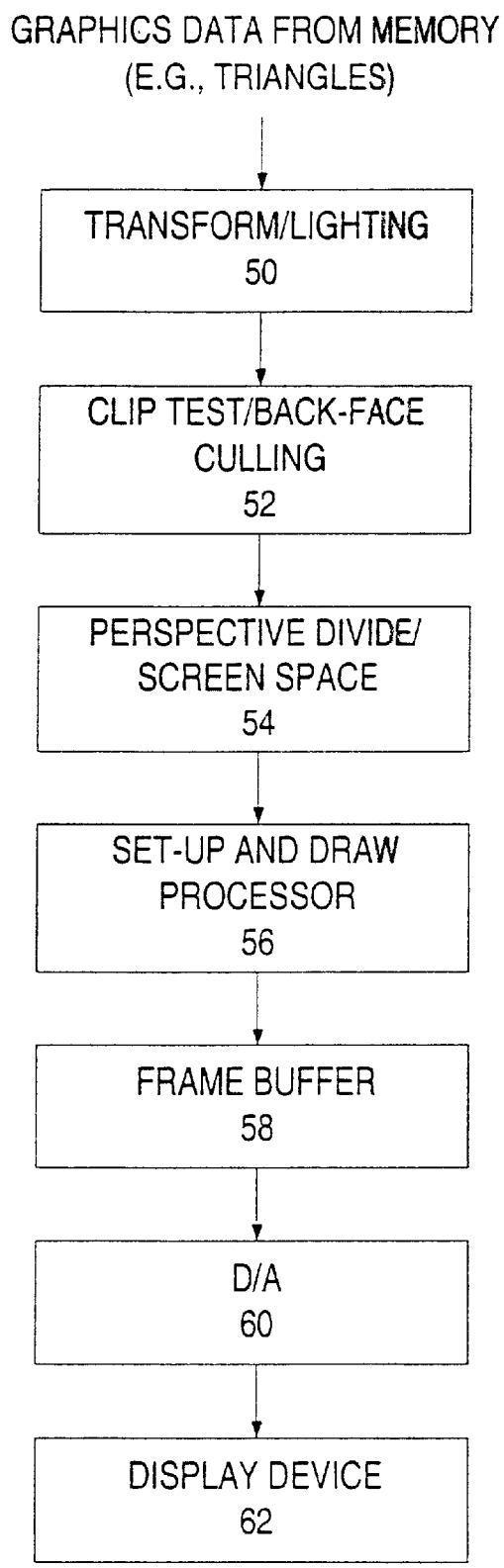
FIG. 1 is a block diagram of one embodiment of a graphics system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF SEVERAL EMBODIMENTS

Figure 2:
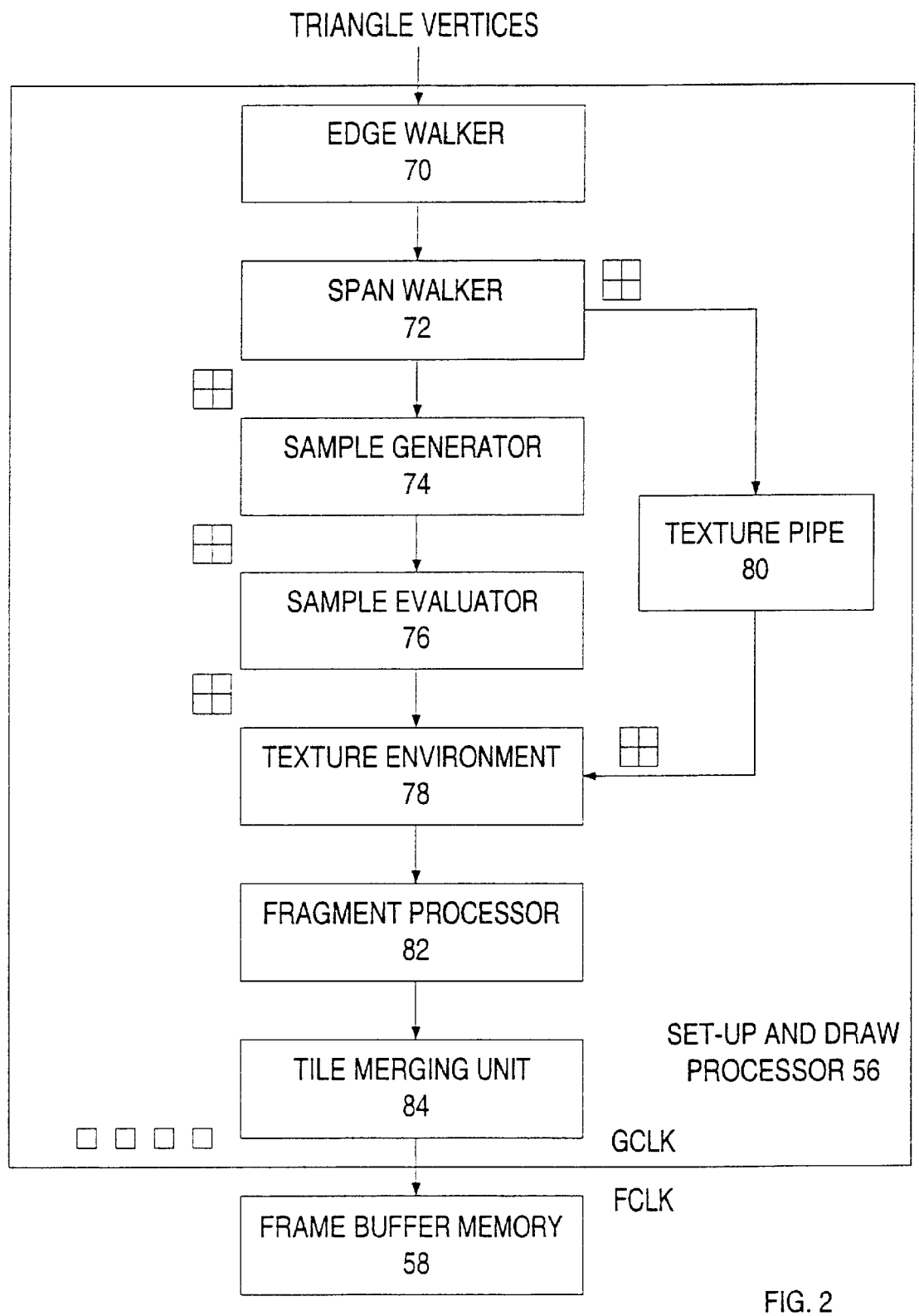
FIG. 2 is a diagram of one embodiment of a set-up and draw processor from FIG. 1.

Turning now to FIG. 2, details of one embodiment of a set-up and draw processor 56 are shown. As the figure illustrates, set-up and draw processor 56 receives triangle vertices e.g., position information such as x and y coordinates) along with associated data (e.g., color and alpha information). The set-up unit 68 computes edge slopes and plane slopes that are used to setup the triangle for walking. This information is passed down to edge walker 70 along with the vertex data. Edge walker 70 walks along the major edge of the triangle generating two spans per clock cycle. These spans are then conveyed to span walker 72. Span walker 72 generates 2×2 tiles along with vertex and slope information. Sample generator 74 receives this information and generates samples, which are then evaluated in sample evaluator 76.

Texture pipe 80 is configured to generate texture information for the tiles proceeding in parallel through the sample generator 74 and sample evaluator 76. Texture environment unit 78 is configured to synchronize the information from sample evaluator 76 and texture pipe 80. Blending, depth cueing, and fog are applied in fragment processor 82. The tiles are conveyed to tile merging unit 84, which is configured to selectively shift pixels (or samples) to increase the percentage of full tiles. The tiles are then output from the set-up and draw processor 56 and stored into frame buffer memory 58.

As shown in the figure, set-up and draw processor 56 is configured to operate on a different clock frequency than frame buffer memory 58. Advantageously, by operating the set-up and draw processor at a faster clock GCLK than the frame buffer clock FCLK, average frame buffer memory write bandwidth utilization may be increased. For example, GCLK may be set to 225 MHz and FCLK may be set to 180 MHz. Effectively, the set-up and draw processor works ahead of the frame buffer to build up a number of tiles within a FIFO memory in tile merging unit 84. The tiles are written into tile merging unit 84 more quickly than they are read out for storage in frame buffer memory 58. However, the tiles written into tile merging unit 84 have a higher number of empty pixel positions. Tile merging unit 84 is configured to shift pixels from newer tiles to older tiles in an effort to reduce the number of empty pixel positions in the tiles that are written to frame buffer memory 58. Occasionally, this shifting may result in one or more completely empty tiles or bubbles performing in the FIFO. These bubbles are removed by the shifting action of the tile merging unit. Thus, while the tiles are written into tile merging unit 84 more quickly than they are read out, the number of tiles read out is less than the number of tiles written into the tile merging unit 84. As a result, the net number of pixels written into and read out of tile merging unit 84 remains the same.

Stated differently, tile merging unit 84 is configured to take a higher frequency set of data with gaps and selectively shift out the gaps to output a lower frequency set of data with fewer gaps. Advantageously, this serves to improve frame buffer bandwidth utilization, thereby reducing the need to unnecessarily increase the operating frequency of the frame buffer.

Figure 3A:
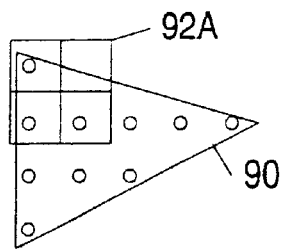
FIGS. 3A–E are examples of one embodiment of a rasterization technique using tiles.
Figure 3B:
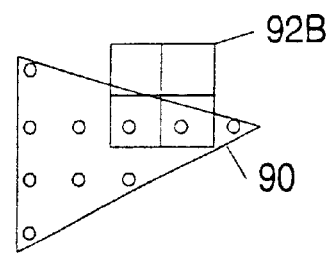
Figure 3C:
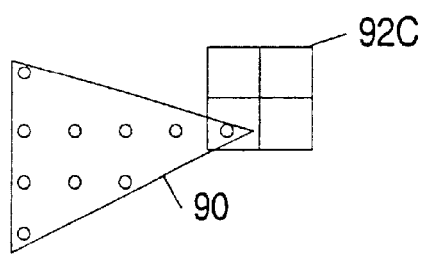
Figure 3D:
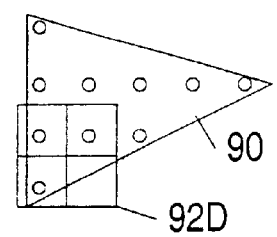
Figure 3E:
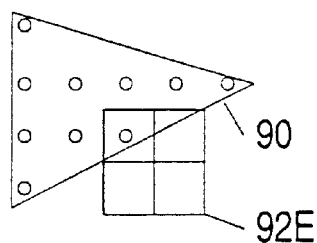

Turning now to FIGS. 3A–3E, one example of tile-based rasterization is illustrated. In this example, set-up and draw processor 56 is configured to rasterize triangles into tiles having two by two (2×2) pixels. In FIG. 3A, the rasterization process has just started, with tile 92A positioned at the three first pixel positions in triangle 90. Tile 92A has one empty pixel position. As the figure illustrates, tile 92A will have one pixel position that is empty. Proceeding now to FIG. 3B, the second tile 92B of the rasterization process is illustrated. Tile 92B has two empty pixel positions. FIGS. 3C–3E illustrate the continuation of the rasterization process by generating tiles 92C, 92D, and 92E respectively. As shown by figures, tiles 92C and 92E each have three empty pixel positions, while tile 92D has one empty pixel position.

This example clearly illustrates that if the tiles are written into frame buffer 58 in the same form as they are generated, frame buffer write bandwidth would be less than optimal. The problem tiles are typically those located at the periphery of the triangle. With very large triangles, the percentage of tiles with one or more empty pixel positions may be small enough not to warrant any additional hardware to remedy the problem. However, as rendering performance has increased, so too has the demand for increasingly realistic 3D scenes. One common method for increasing the realism of a scene is to increase the number and reduce the size of polygons. Thus, the trend is to create more smaller triangles. This combined with demands for increased frame rates has the potential to cause severe bottlenecks at the frame buffer write stage of the pipeline.

Figure 4:
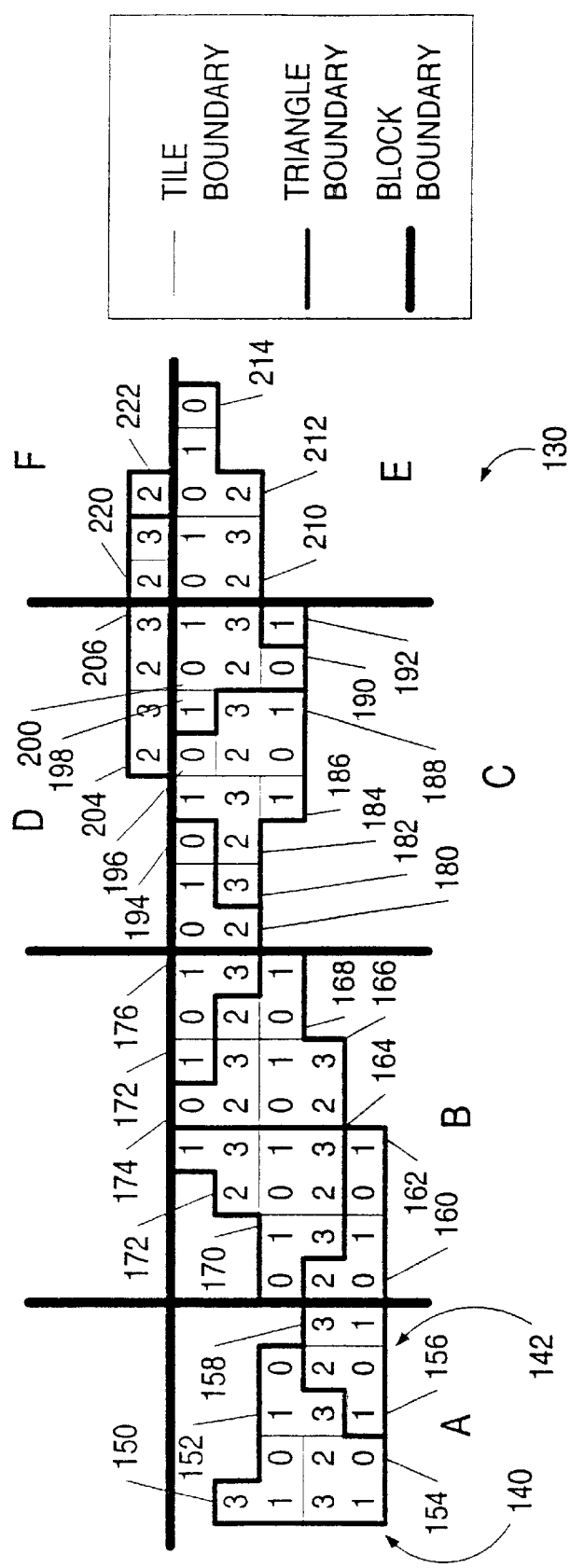
FIG. 4 is a diagram one embodiment of a triangle strip.

Turning now to FIG. 4, a detailed example of a typical triangle strip 130 to be rendered is shown. Strip 130 consists of a number of triangles that are rasterized into 2×2 tiles of pixels.

For example, triangle 140 has ten pixels that are rasterized into tiles 150, 152, and 154. Similarly, triangle 142 has five pixels that are rasterized into tiles 156 and 158. A 2×2 pixel configuration for each tile may be used to guarantee that each of the four pixels within a tile is from a different interleave within the same memory block.

Many frame buffers are configured with pixel caches that serve to increase memory access bandwidth. For example, 3DRAM and 3DRAM-64 memories are types of memory used in frame buffers that have pixel caches. These pixel caches typically access a page of memory from the main frame buffer array. The pixel cache may be configured with hardware capable of performing read-modify-write (e.g., to implement alpha blending or z-compares). Once the page has been modified, the pixel cache may write the page back to the main frame buffer memory.

Many frame buffer memories are also configured into banks to support interleaving. For example, bank A may be accessed during a first clock cycle while bank B is refreshed, and then bank B may be accessed during a second clock cycle while bank A is being refreshed. Use of this configuration of frame buffer memory typically requires that a particular write to the frame buffer not cross memory bank boundaries. Each bank may have its own pixel cache, or one large pixel cache may have areas devoted to each memory bank.

Thus, in order to efficiently utilize the limited bandwidth available to the frame buffer, the set-up and draw processor may be configured to restrict tiles to a particular block of memory (to prevent page faults). The size and positioning of the block boundaries may be determined based on the configuration of the frame buffer memory. In FIG. 4, six blocks have been identified (i.e., blocks A, B, C, D, E, and F).

To further improve efficiency, the tiles may each have a number of defined pixel positions to support interleaved memory. For example, tile 154 has four pixel positions labeled 0, 1, 2, and 3. Each pixel in a 0 pixel position (regardless of which tile the pixel is in) may be stored to a first memory bank or interleave. Each pixel in a 1 pixel position may be stored to a second memory bank or interleave. Similarly, each pixel in a 2 and 3 pixel position may be stored to a third and fourth memory bank or interleave, respectively.

Figure 5A:
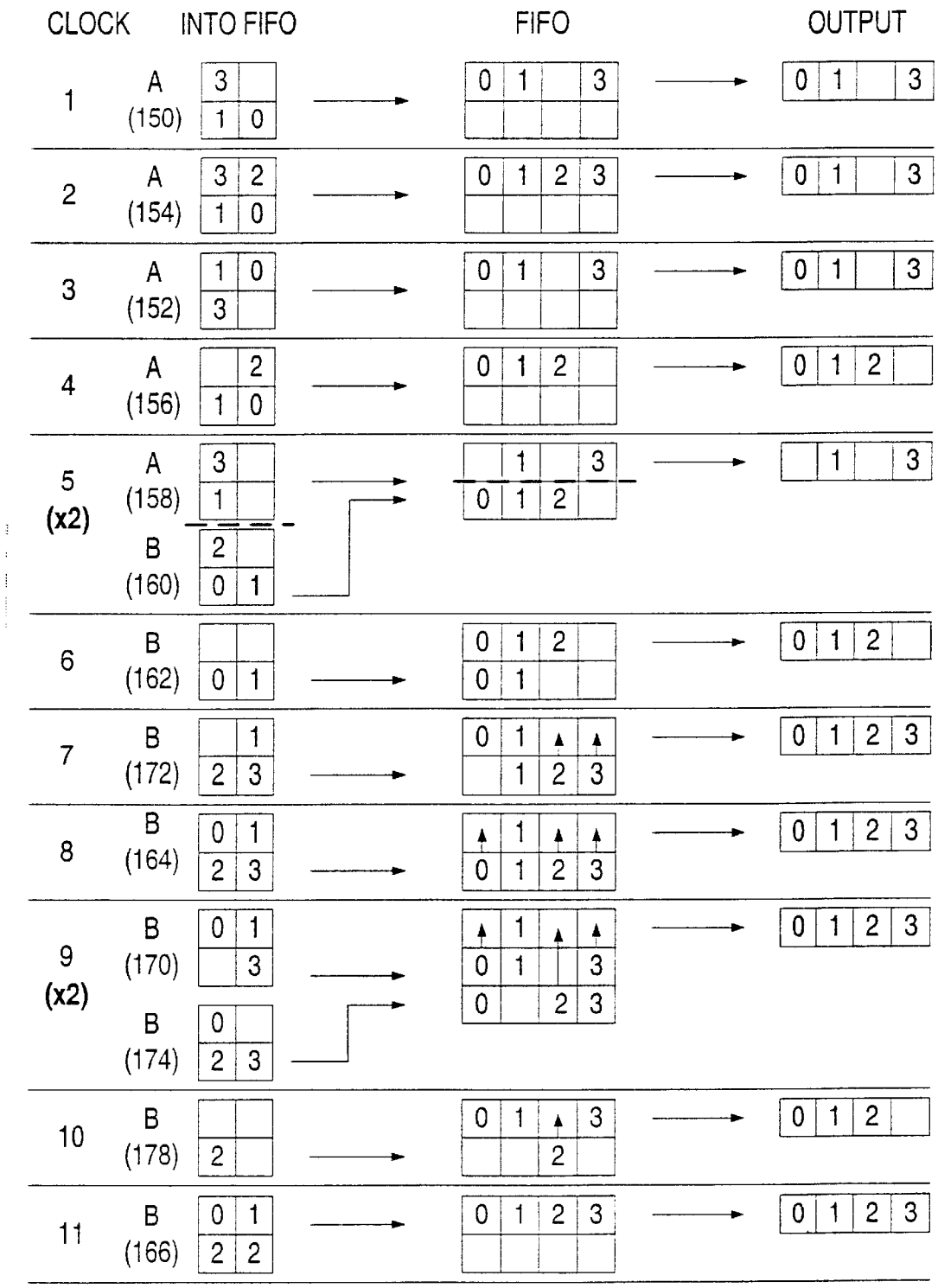
FIGS. 5A–C are a diagram illustrating one embodiment of a method for pixel packing.
Figure 5B:
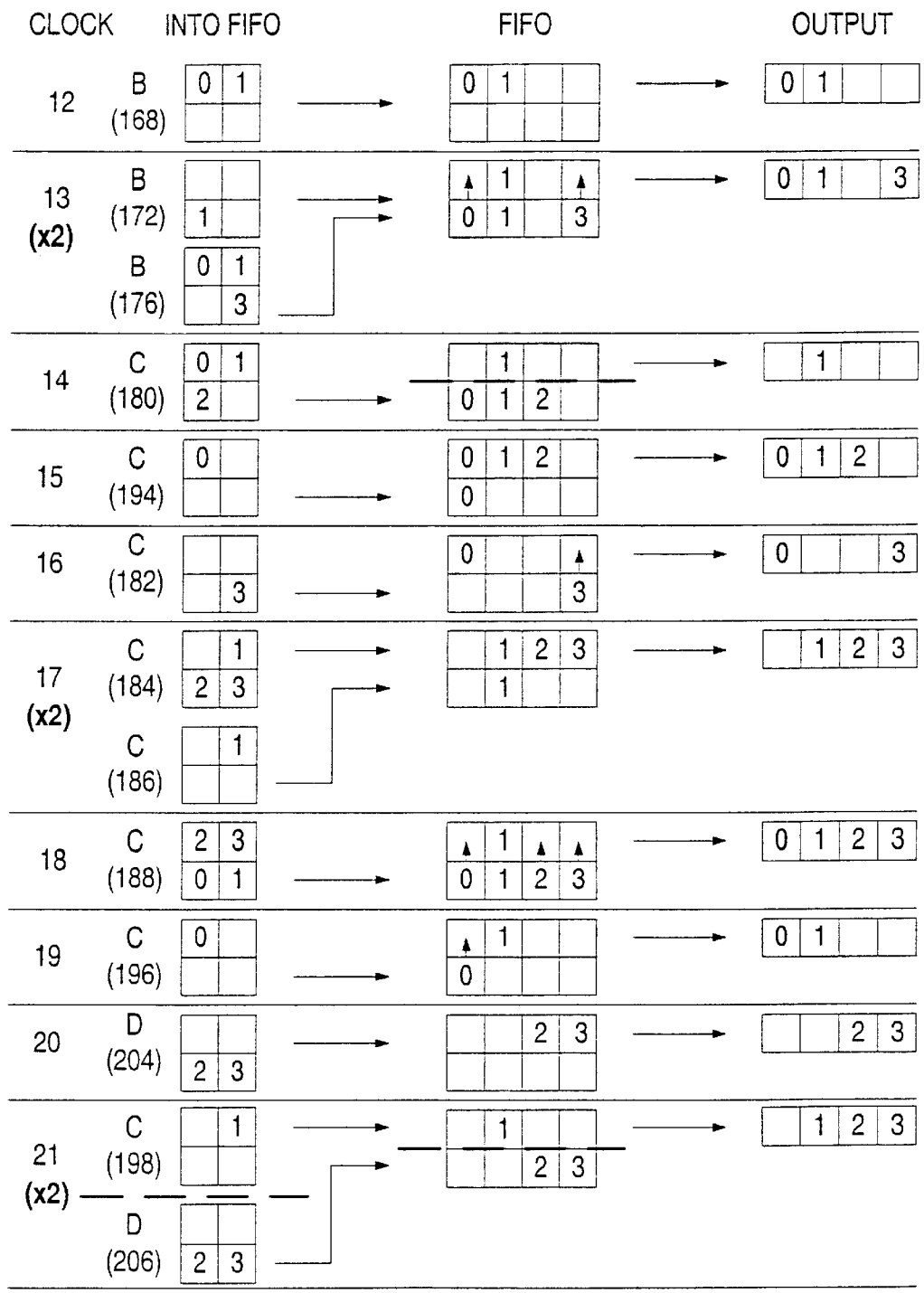
Figure 5C:
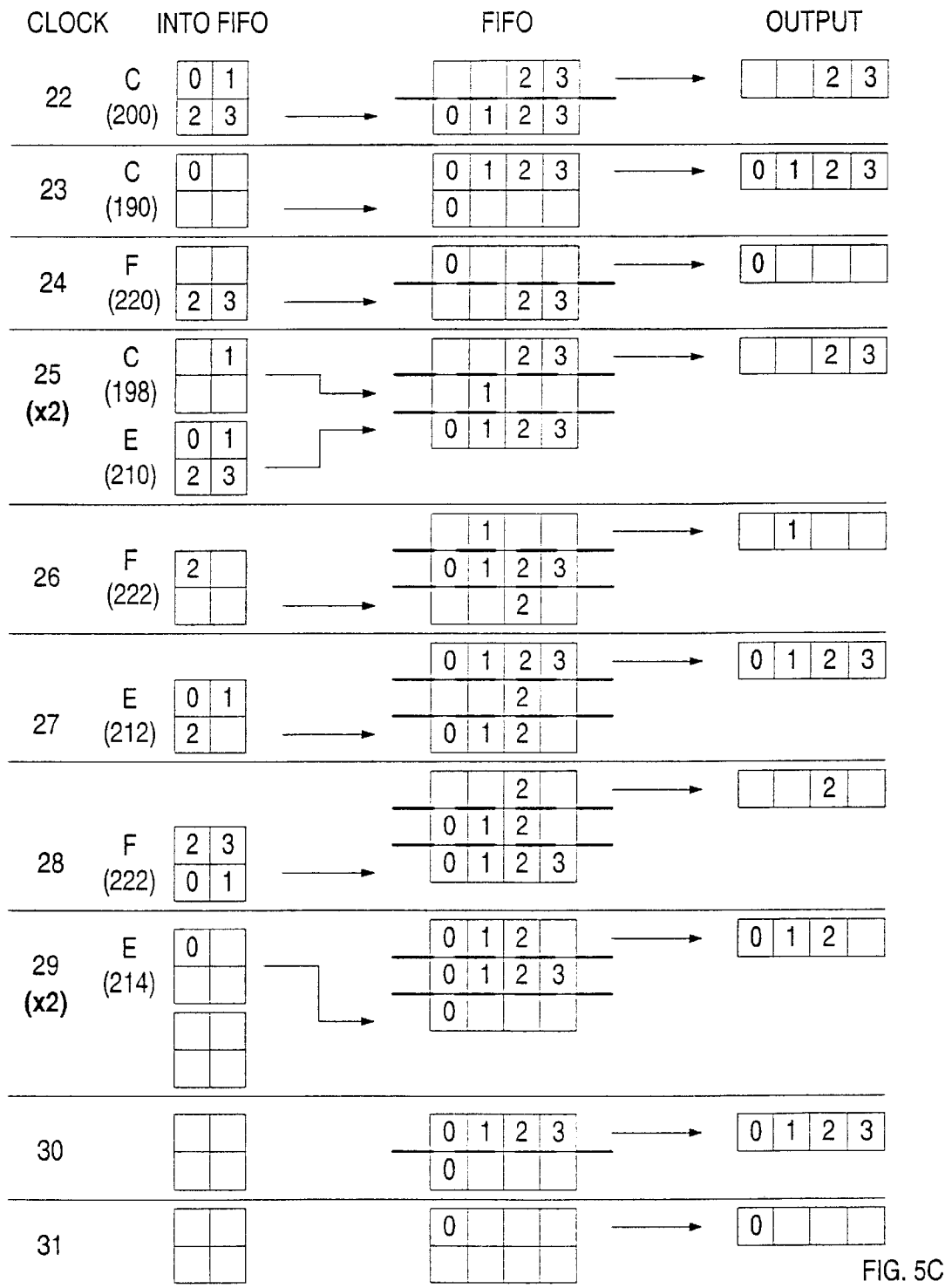

Turning now to FIGS. 5A–C, one embodiment of a method for pixel packing is illustrated. In this example, the contends of a FIFO memory within a time merging unit are illustrated along with the output of tile merging unit that is to be stored in a frame buffer. The method illustrates how the pixels from FIG. 4 may be pixel packed to improve the fill rate of a frame buffer. Starting with FIG. 5A, tile 150 is received by the tile merging unit as shown in clock cycle 1. The pixels from tile 150 may be output during the same clock, or there may be some latency (e.g., one clock cycle). This results in only 75% percent of the frame buffer bandwidth is used and no pixel packing being performed.

During the next three clock cycles (labeled 2–4), the tile merging unit receives pixels from tiles 154, 152, and 156. These are also output to the frame buffer as they are received. During clock cycle 5, however, the tile merging unit receives two tiles (i.e., tiles 158 and 160). This is due to the mismatch in GCLK and FCLK speeds. As noted above, the set-up and draw processor operates at GCLK (e.g., 225 MHz), while the tile merging unit's output operating at FCLK (e.g., 180 MHz) to match the operating frequency of the frame buffer write port. While different speed combinations of GCLK and FCLK may be used, the difference in speeds may influence what size of FIFO memory is selected and how effective the tile merging unit will be in pixel packing. In the example of FIGS. 5A–C, two tiles are received by the tile merging unit approximately every fourth cycle. If the tile merging unit's FIFO memory ever becomes full, it may be configured to cause a stall further up the set-up and draw processor's pipeline until more room can be freed in the FIFO.

Normally, pixel packing could occur in clock cycle 5 (i.e., the pixel from pixel position 0 in tile 160 could be shifted to fill the corresponding empty position in tile 158), but tiles 158 and 160 are from different blocks. Thus no shifting can take place, or an undesirable page fault could occur in the frame buffer. Instead, the pixels from tile 158 are output, and the pixels from tile 160 remain in the FIFO until the next clock cycle.

During clock cycle 6, the pixels from tile 160 are output while the pixels from tile 162 are received and stored in the FIFO. Pixel packing does not take place because tile 162 does not have a pixel for pixel position 3. If a pixel from tile 162's pixel position 0 or 1 is shifted into the pixel position 3 of tile 160, the pixels in tile 160 would not be from different interleaves. This could cause problems at the frame buffer because the write interface for each interleave is most likely optimized to receive only a single pixel for each interleave per clock cycle. Thus, no pixel packing takes place during clock cycle 6.

During clock cycle 7, however, tile 172 is received, and the pixels from tile 172's pixel positions 2 and 3 are shifted into the empty pixel positions from tile 170. Thus, four pixels are output to the frame buffer yielding full bandwidth utilization. The shifting/pixel packing function is illustrated by the arrows in the FIFO of clock cycle 7. The process of receiving tiles and selecting shifting pixels (when possible) continues from clock cycle 7 of FIG. 5A through clock cycle 31 of FIG. 5C.

The effect that pixel packing has on fill rate can be seen in clock cycle 28, at which time the tile merging unit has received approximately 34 tiles and output 28 tiles, with a merging efficiency of approximately 20%.

As noted above, shifting pixels from one block to another is not permitted in most embodiments. The tile merging unit may be configured to perform the following two divide operations in order to determine the block information for each tile: (i) [tile x coordinate/block_x size], and (ii) [tile y coordinate/block_y size]. For example, in one non-super-sampled embodiment the block_x size is 16 pixels and the block_y size is 8. In one non-super-sampled stereo embodiment (i.e., two images, one for each eye), the block_x size is 16 pixels and the block_y size is 4. Other sizes are also possible and contemplated.

Figure 6:
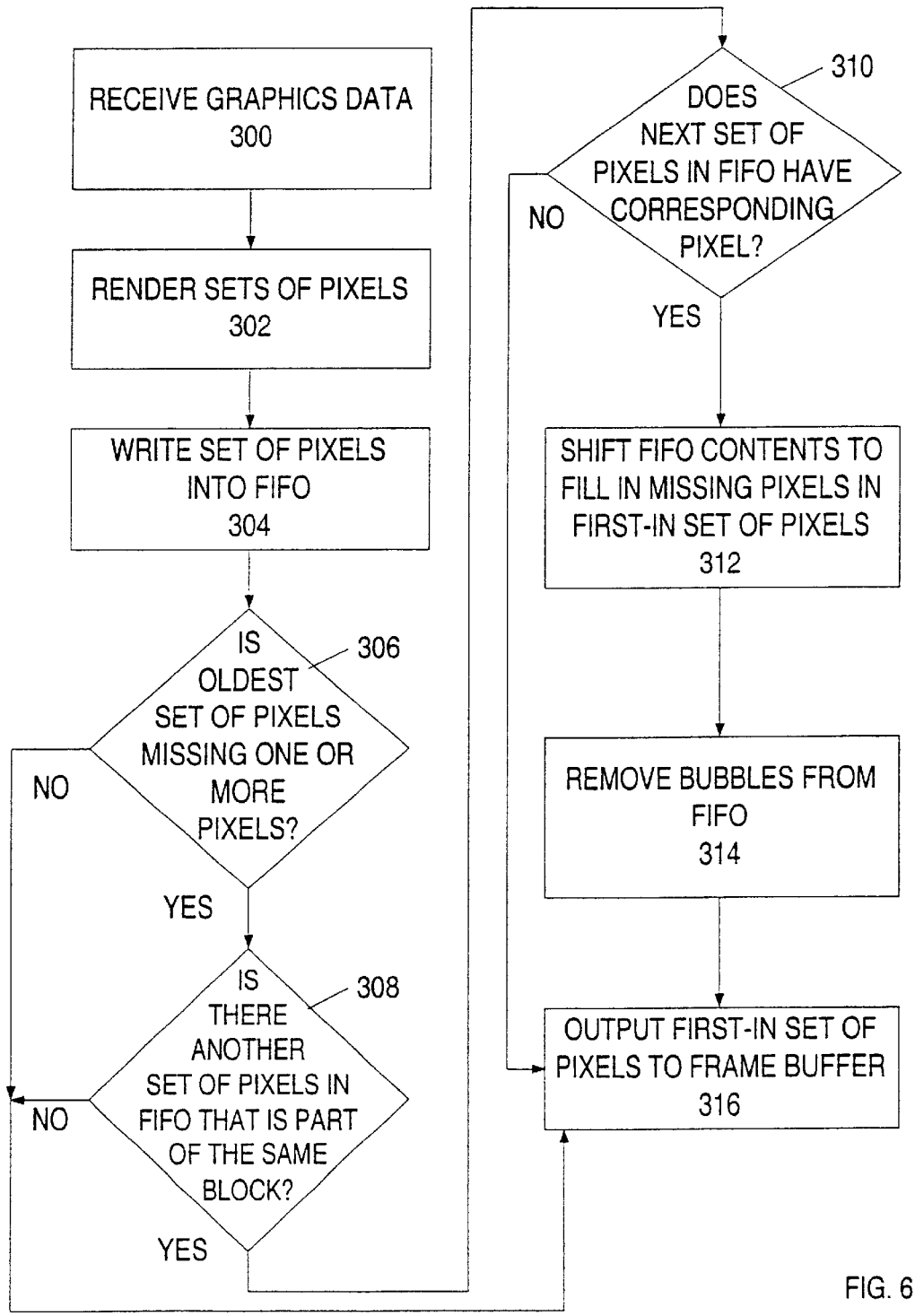
FIG. 6 is a flowchart illustrating another embodiment of a method for pixel packing.

Turning now to FIG. 6, a flowchart of one embodiment of a method for pixel packing is 10 shown. First, graphics data is received by the graphics system (step 300). Next, the graphics data is separated into triangles, and the triangles are divided into pixels which are then grouped into tiles and rendered (step 302). Note, as used herein the term "set of pixels" and the term "tile" are used interchangeably to mean a group of pixels. As noted above, in the preferred embodiment the group of pixels are all within a common block and each belong to a different interleave.

Next, the tiles of pixels are forwarded to a FIFO, e.g., within a tile merging unit (step 304). The tiles in the FIFO are examined to determine whether the oldest received tile has any empty pixel positions (i.e., missing pixels) (step 306). If not, then there is no need to perform any pixel packing on this tile, and the FIFO may simply output the full tile "as-is" to the frame buffer (step 316). If, however, there are one or more empty pixel positions in the tile, then one or more other tiles in the FIFO may be examined to determine whether they are in the same block as the oldest tile (step 308). If no other tiles in the FIFO are within the same block, then in this embodiment there are no candidate pixels to be shifted. Thus, the oldest tile is output "as-is" to the frame buffer, i.e., with empty pixel positions (step 316). If, however, there are one or more tiles in the FIFO that are in the same block as the oldest tile, then those tiles are examined to determine if they have one or more pixels that correspond to the empty pixel position or positions in the oldest tile (step 310). As described above, in embodiments that interleave pixel writes to the frame buffer, only pixels that are of different interleaves may be pixel packed together. If any pixels meet the pixel packing criteria, they may be shifted into the oldest tile (step 312). Any empty tiles forming "bubbles" may be removed by shifting all tiles beyond the bubble by one position in the FIFO (step 314). The oldest tile, together with any newly packed pixels, is output for eventual storage in the frame buffer (step 316). In some embodiments, multiple set-up and draw units may be used, and corresponding switching logic may service as an interface between the multiple set-up and draw units and the frame buffer.

Note, FIG. 6 merely illustrates one possible embodiment of the method for pixel packing. Other embodiments are possible and contemplated. For example, additional criteria may be applied to the pixels that are candidates for pixel packing before the shifting actually takes place. Furthermore, different configurations of the FIFO may be utilized to implement 10 different types of shifting. For example, referring back to FIG. 5A, in clock cycle 9, in one embodiment the pixel in pixel position 3 of tile 174 may be shifted forward to join the pixel of pixel position 1 of tile 170. In another embodiment, the pixel in pixel position 3 of tile 174 may remain unshifted (e.g., until clock cycle 10 at which time it could be shifted with the contents of tile 178). The method is preferably implemented in hardware, but a combination of hardware and software or software-only may also be possible in some embodiments.

In some embodiments, intervening tiles from other blocks may simply be ignored or skipped over during the pixel packing process. In other embodiments, tiles may be searched in time order beginning with the next-to-oldest and ending with the first tile that is from a different block. While greater flexibility is most likely preferable in the operation of the FIFO, in some cases reducing the hardware needed to control the FIFO or increasing the speed may dictate less flexible solutions. Similarly, in some embodiments pixels from multiple tiles may be combined into a single tile during a single clock cycle (see, e.g., clock cycle 9 of FIG. 5A), while in other embodiments certain timing restrictions may apply.

Figure 7:
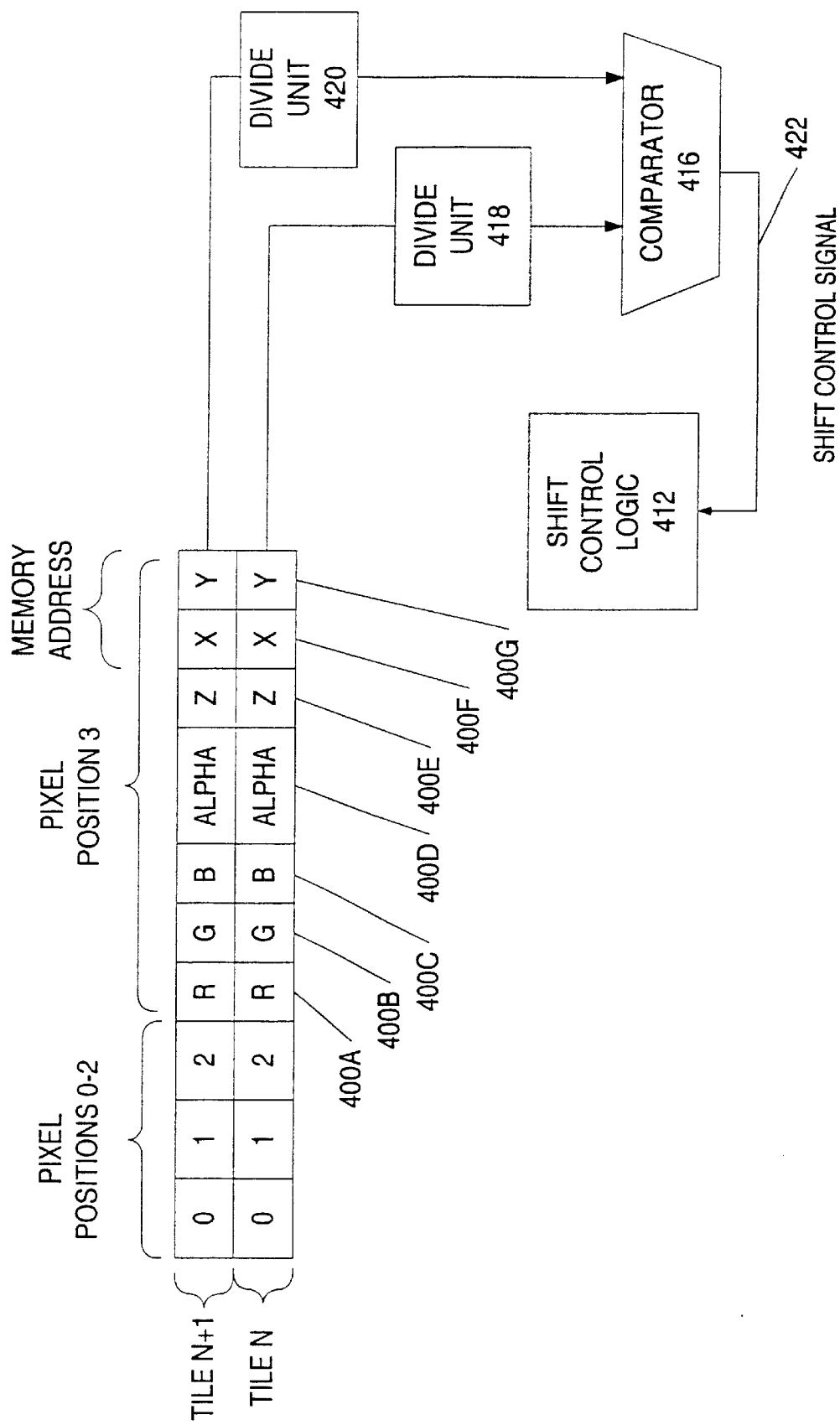
FIG. 7 is a diagram illustrating one embodiment of a FIFO memory usable in a tile merging unit for pixel packing.
Figure 8:
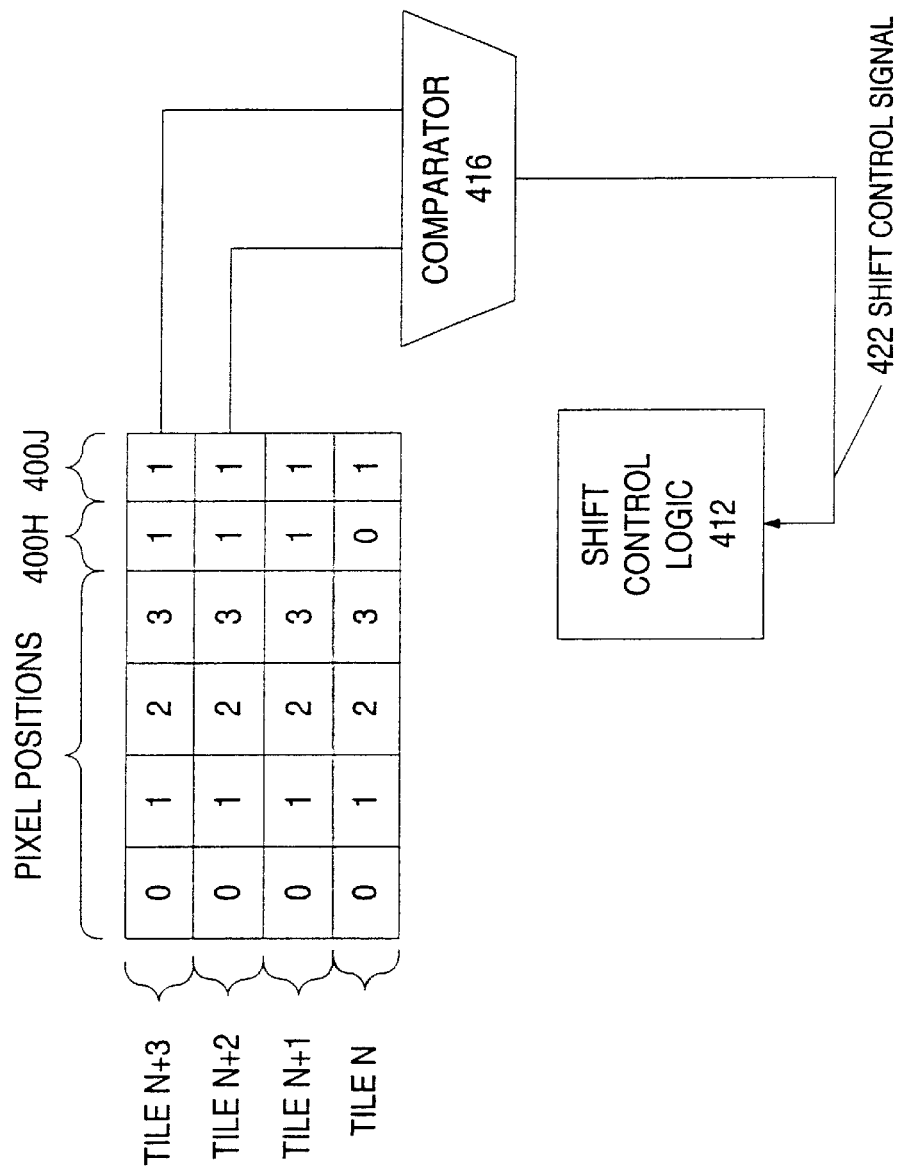
FIG. 8 is a diagram illustrating another embodiment of a FIFO memory usable in a tile merging unit for pixel packing.

Turning now to FIGS. 7 and 8, details of two embodiments of the tile merging unit's FIFO memory are shown. In FIG. 7, the tile merging unit includes a shift control logic unit 412, a comparator 416, and two divide units 418 and 420. As shown in the figure, each pixel stored in the FIFO may include color information (400A–C), transparency information (400D), depth information (400E), and position information (400F–G). A portion of the position information 400F–G may be common for the entire tile. The tile-based portion of the position information may be conveyed to divide units 418 and 420 for tiles N and N+1, respectively. In one embodiment, divide units 418 and 420 may be configured to divide the position information to determine the block to which the tile (and pixels) belong. Next, the comparator 416 may be configured to compare the two block values to determine if the tiles (and pixels) are in the same block. The comparator 416 may then generate a shift control signal 422 for shift control logic 412 that is indicative of whether or not the pixel may be shifted. Additional control logic may be used to detect the presence of valid pixels for shifting.

In FIG. 8, another embodiment of the FIFO is shown. In this embodiment, the FIFO is configured to store a block indicator 400H and a data valid indicator 400J for each tile. Block indicator 400H may be calculated earlier in the set-up and draw unit or in the tile merging unit by dividing (i) [tile x coordinate/block_x size], and (ii) [tile y coordinate/block_y size]. The block indicators for two tiles may be compared using comparator 416, which in turn generates a control signal usable by the shift control logic 412 to allow the FIFO to shift the pixels if the blocks are the same. The data valid indicators 400J may also be examined to determine whether pixels or tiles should be shifted to remove bubbles that form in the FIFO. Depending on the configuration, multiple comparators may be used to compare different combinations of tile block indicators 400H in parallel. Note, FIGS. 7 and 8 merely illustrate two examples of some of the control logic that may be used in the tile merging units. Other configurations are possible and contemplated. For example, in some embodiments the tile merging unit may include a number of individual FIFOs equal to the maximum number of pixels allowable in a single tile. Each FIFO may thus shift pixels independently as long as any of the aforementioned restrictions regarding different interleaves and common blocks that apply to the particular embodiment are met.

Turning now to FIGS. 9 and 10, tables illustrating the fill rates of one embodiment of a tile merging unit in both pixels per clock cycle and millions of triangles per second are shown. As the figures illustrate, high fill rates are achieved with deeper FIFO memories in most cases (excluding one pixel triangles). These fill rates may vary according to the actual configuration implemented and the operating frequencies.

Figure 11:
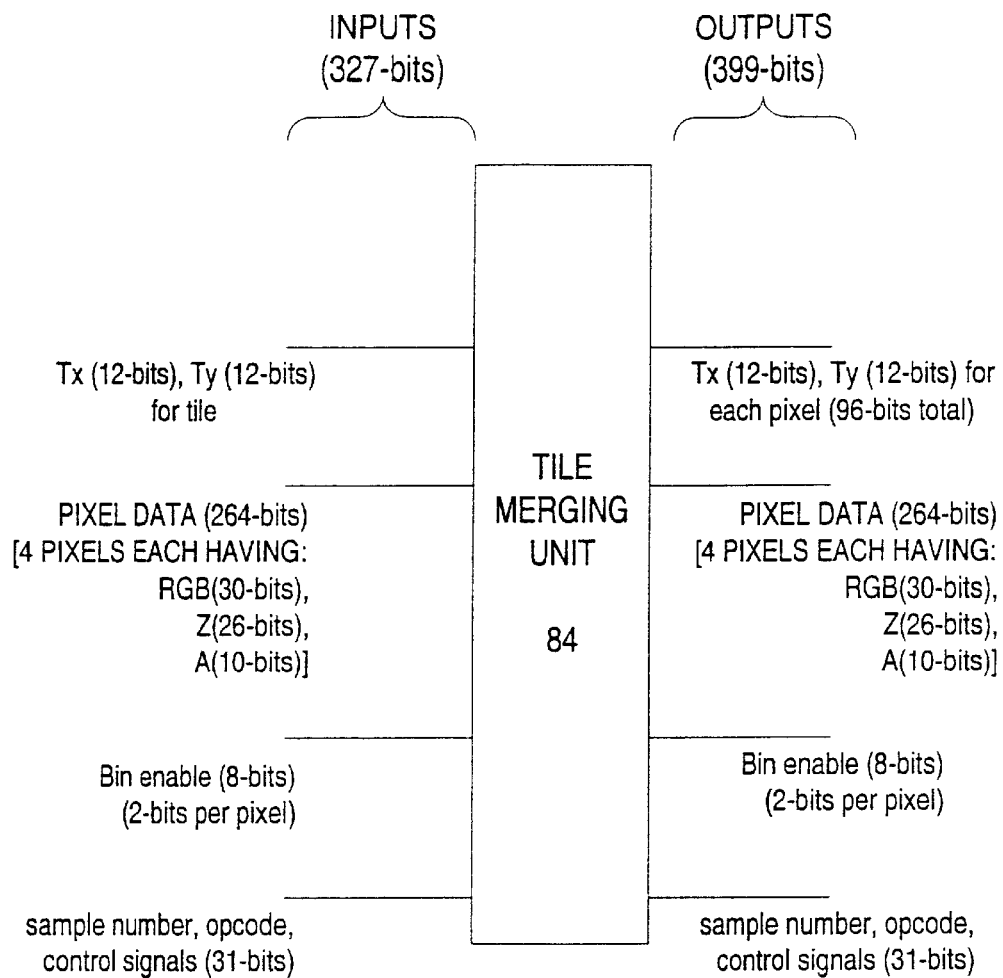
FIG. 11 is a diagram of one embodiment of an interface for tile merging unit of F, Y or Z.

Turning now to FIG. 11, a figure illustrating one embodiment of the tile merging unit interface is shown. As the figure illustrates, Tx and Ty position information is input on a per-tile basis, while it is output on a per-pixel basis. This is because the pixel packing may shift pixels, thereby making it difficult to determine where a particular pixel should be stored within the current block of memory in the frame buffer. Other inputs and outputs to the tile merging unit include 264-bits of pixel data (including 30 bits of color information, 26-bits of depth information, and 10-bits of transparency information for each of the four pixels). Control information (including opcodes and internal numbering if samples are used in lieu of pixels) may also be stored (e.g., 31-bits). Bin enable signals (e.g., 2-bits per pixel) may also be used in implementations that store pixels or samples in bins. Bins are used to store groups of pixels or samples. For example, in a super-sampled graphics system, each bin may store four samples, with sixteen samples being filtered to form each pixel. Note, the bit lengths of the interface are merely an example and may vary according to the actual implementation being used. For example, more pixels may be included in each tile, or the pixels may have greater or fewer bits of color information.

Turning now to FIGS. 12 and 13, an example of different latencies for one embodiment of a set-up and draw processor is shown. To obtain the numbers in FIGS. 12 and 13, a number of assumptions were made, including: (a) the presence of 6 set-up units, (b) a double-buffered interface between the set-up and edge walker units, (c) an edge walker unit that delivers two spans per GCLK clock cycle, (d) a span walker that delivers one 2×2 tile per GCLK clock cycle, and (e) a tile merging unit. In the Figures, SU represents one embodiment of set-up unit 68, EW represents one embodiment of edge-walker unit 70, SW represents one embodiment of span walker unit 72, and TMU represents one embodiment of tile merging unit 84.

In FIG. 12, the first row corresponds to the set-up (SU) and draw processor as a whole (e.g., set-up and draw processor 56 of FIG. 2). The second row corresponds to the latency of one embodiment of an edge walker (e.g., edge walker 70 of FIG. 2). The third row corresponds to the latency of one embodiment of a span walker (e.g., span walker 72 of FIG. 2). The fourth row corresponds to the latency of one embodiment of a fragment processor (e.g., fragment processor 82 of FIG. 2). Note that the latency of the span walker and the fragment processor is specified in pixels per clock, while the latency of the set-up and draw processor and the edge walker are specified in clocks per graphics primitive. As the figure illustrates, triangles with larger numbers of pixels (going across the table) generally result in longer latencies in the edge walker, but more efficient performance in the span walker and fragment processor.

Turning now to FIG. 13, performance of the same example graphics system is specified in terms of millions of triangles processed per second. As the figures illustrate, for this sample embodiment using 1–10 pixel non-textured, non-supersampled triangles, the set-up unit is the bottleneck. With five parallel set-up units the throughput is 73 million triangles per second at 250 MHz (GCLK). For 25 pixel triangles, the fill rate and the throughput drops to 32 million triangles per second at 250 MHz (GCLK). Note, the numbers in FIGS. 12 and 13 assume merging pixels across tiles, but no merging across primitives.

For ease of hardware implementation, the algorithm described above may be modified. For example, the FIFO memory that stores tiles from the GCLK domain may tag each interleave within a tile with a block number and a count based on the time of arrival of that tile into the FIFO memory. This may allow more efficient use of the FIFO memory's available resources. When preparing to merge tiles, the tag may be used as an additional constraint. For example, interleaves with lower tags may be constrained so that they are sent out before interleaves with higher tags. In another example, interleaves may be constrained to merge only with other interleaves that have the same block tag.

Turning now to FIGS. 14 and 15, two embodiments are depicted. FIG. 14 depicts one embodiment of a FIFO configured without tags, while FIG. 15 depicts one embodiment of a FIFO configured to utilize tags. The lowercase subscripts indicate to which block the interleaves belong. The numerical subscript in FIG. 15 indicate the tag number assigned to each interleave. As the figures illustrate, the embodiment using the tags may potentially allow tighter packing and therefore more efficient use of available resources. In FIG. 15, cycle 1, interleaves 0, 1, and 3, each having a tag 0, are merged with interleave 2 having a tag 1. In cycle 2, interleave 1 with tag 1 is sent out by itself since there are no merge opportunities. Note that tag 1 is sent out ahead of tag 2. Note, in some embodiments a limited number of bits may be allocated to the tag, and the control logic may be configured to account for rolling the counter over to zero once the maximum tag number has been reached.

A system and method for pixel packing to improve frame buffer fill rate performance has been disclosed. While the embodiments described herein and illustrated in the figures have been discussed in considerable detail, other embodiments are possible and contemplated. It should be understood that the drawings and detailed description are not intended to limit the invention to the particular forms disclosed, but on the contrary, the intention is to cover all modifications, equivalents, and alternatives falling within the spirit and scope of the present invention as defined by the appended claims.

What is claimed is:

1. A method for efficiently transferring output pixels, received from one or more graphics data rendering pipelines, to a frame buffer, the method comprising:

receiving a tile of output pixels from one or more rendering pipelines, wherein a tile comprises one or more pixels, up to a specified maximum number of pixels, and wherein a full tile comprises the specified maximum number of pixels;

storing the tile in one or more first-in first-out (FIFO) write queues connected to the output of the rendering pipelines;

determining whether a second tile of pixels stored in the FIFO write queues has one or more pixels eligible to be shifted to a first tile, in response to detecting that the first tile of pixels is not a full tile of pixels;

shifting the one or more eligible pixels from the second tile into the first tile; and transferring the first tile of pixels from the FIFO write queues to a frame buffer, wherein said shifting results in an increase in the average number of pixels stored in the frame buffer per frame buffer write cycle.

2. The method of claim 1, wherein said determining includes calculating whether the one or more eligible pixels have addresses falling within a predefined range relative to the other pixels of the first tile.

3. The method of claim 1, wherein said determining includes calculating whether the second tile has an address falling within a predefined range of the first tile's address.

4. The method of claim 1, wherein said determining includes calculating whether the one or more pixels to be shifted have memory addresses falling within a same memory bank as the other pixels in the first tile.

5. The method of claim 1, further comprising determining whether a third tile of pixels stored in the FIFO memories has pixels to shift to the first tile.

6. The method of claim 1, further comprising determining whether another tile of pixels stored in the FIFO memories after the first and second tiles has one or more pixels to shift to the first tile or second tile in order to fill in gaps in the first tile or second tiles.

7. The method of claim 1, wherein each tile of pixels has a plurality of pixel positions, and wherein said shifting is performed within the same pixel position within the first and second tiles.

8. The method of claim 1, wherein said shifting includes removing one or more bubbles in the FIFO memories within a common boundary block.

9. The method of claim 1, wherein said FIFO includes a plurality of columns, wherein each column is configured to store pixels destined for a particular memory interleave of the frame buffer, and wherein said shifting occurs within columns.

10. The method of claim 1, wherein said shifting includes shifting selected pixels having a common position within subsequent tiles that are part of a common block with the first and second tiles.

11. The method of claim 1, wherein each tile is configured to store up to four pixels, wherein each tile storing four pixels is a full tile.

12. A method for efficiently transferring output samples, received from one or more graphics data rendering pipelines, to a frame buffer, the method comprising:

receiving a tile of samples from one or more rendering pipelines, wherein a tile comprises one or more samples up to a specified maximum number of samples, and wherein a full tile comprises the specified maximum number of samples;

storing the tile in one or more first-in first-out (FIFO) write queues connected to the output of the rendering pipelines;

determining whether a second tile of samples stored in the FIFO write queues has one or more samples eligible to be shifted to a first tile, in response to detecting that the first and oldest tile of samples is not a full tile of samples;

shifting the one or more eligible samples from the second tile into the first tile; and transferring the first tile of samples from the FIFO write queues to a frame buffer, wherein said shifting results in an increase in the average number of samples stored in the frame buffer per frame buffer write cycle.

13. The method of claim 12, further comprising tagging the samples with tags to identify the sample's interleave.

14. The method of claim 13, further comprising using the tags to determine which of the samples are suitable to be shifted.

15. A system for efficiently transferring pixels output from one or more graphics data rendering pipelines to a frame buffer, the system comprising:

one or more rendering pipelines configured to output a tile of pixels, wherein a tile comprises one or more pixels up to a specified maximum number of pixels, and wherein a full tile comprises the specified maximum number of pixels;

one or more first-in first-out (FIFO) write queues connected to the output of the rendering pipelines and configured to store the tile;

a frame buffer connected to the write queues; and an interface for:
    storing the tile in the write queues,
    determining whether a second tile of pixels stored in the write queues has one or more pixels eligible to be shifted to a first tile, in response to detecting that the first and oldest tile of pixels is not a full tile of pixels,
    shifting the one or more eligible pixels from the second tile into the first tile, and
    transfering the first tile of pixels from the write queues to the frame buffer, wherein said shifting results in an increase in the average number of pixels stored in the frame buffer per frame buffer write cycle.

16. The system of claim 15, wherein the frame buffer is a double buffered frame buffer.

17. The system of claim 15, wherein the frame buffer is an external memory separate from the rendering chip.

18. The system of claim 15, wherein the write queues and rendering pipelines are on a common chip.

\* \* \* \* \*